Oct. 10, 1961  M. E. ERIKSEN  3,003,186
FISH CLEANING MACHINE
Filed Oct. 12, 1959  5 Sheets-Sheet 1

MONRAD E. ERIKSEN
*INVENTOR.*

BY *Smith & Tuck*

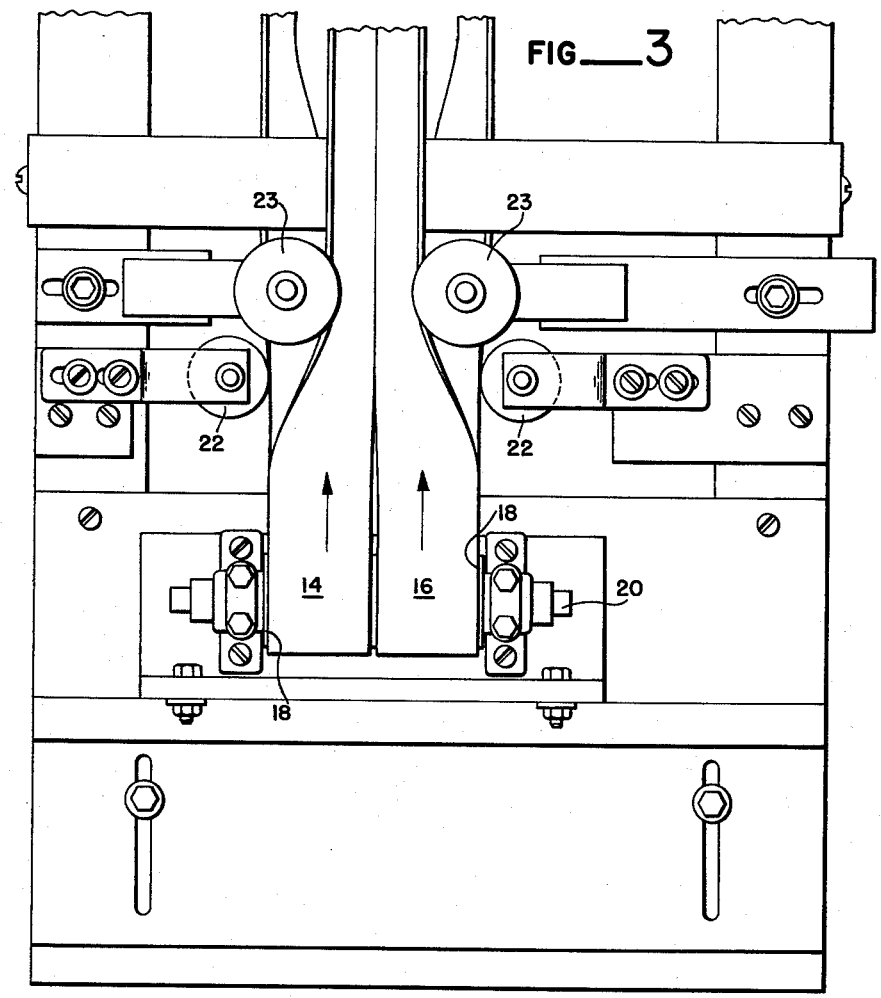
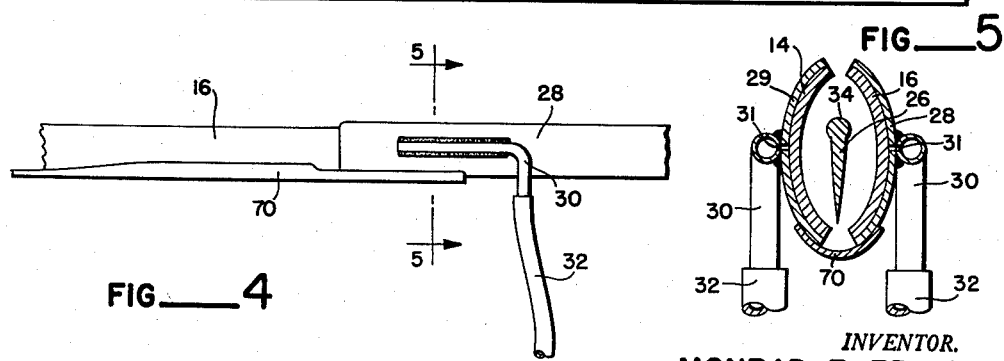
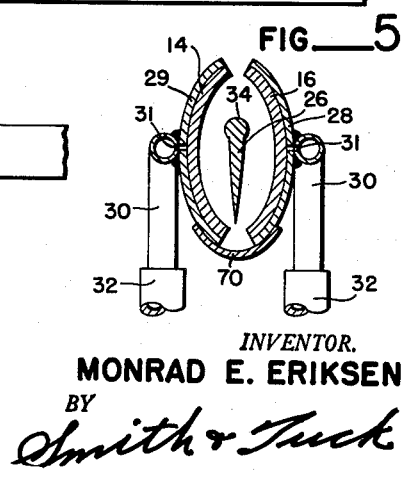

Oct. 10, 1961

M. E. ERIKSEN 3,003,186

FISH CLEANING MACHINE

Filed Oct. 12, 1959

MONRAD E. ERIKSEN
*INVENTOR.*

BY
*Smith & Tuck*

Oct. 10, 1961   M. E. ERIKSEN   3,003,186
FISH CLEANING MACHINE
Filed Oct. 12, 1959   5 Sheets-Sheet 4
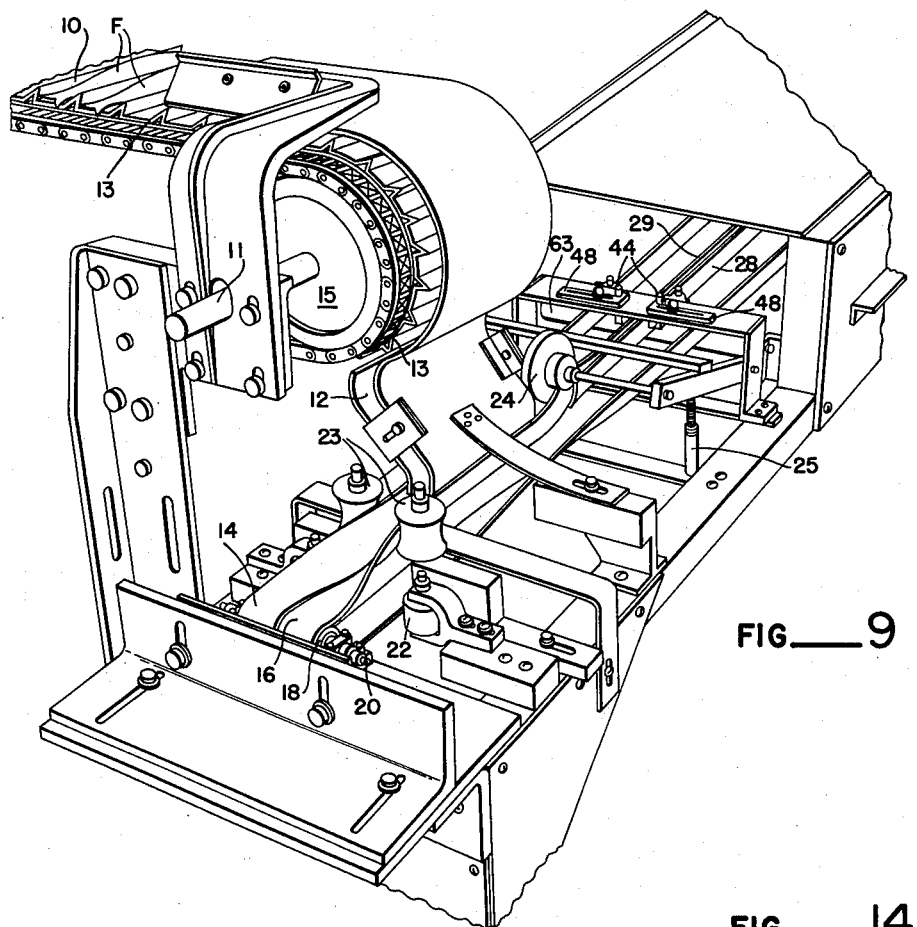
FIG. 9
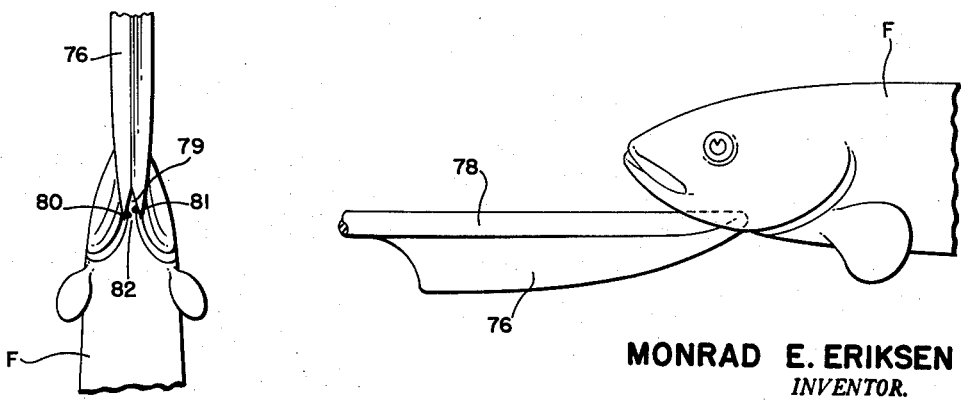
FIG. 13
FIG. 14
MONRAD E. ERIKSEN
*INVENTOR.*
BY Smith & Tuck

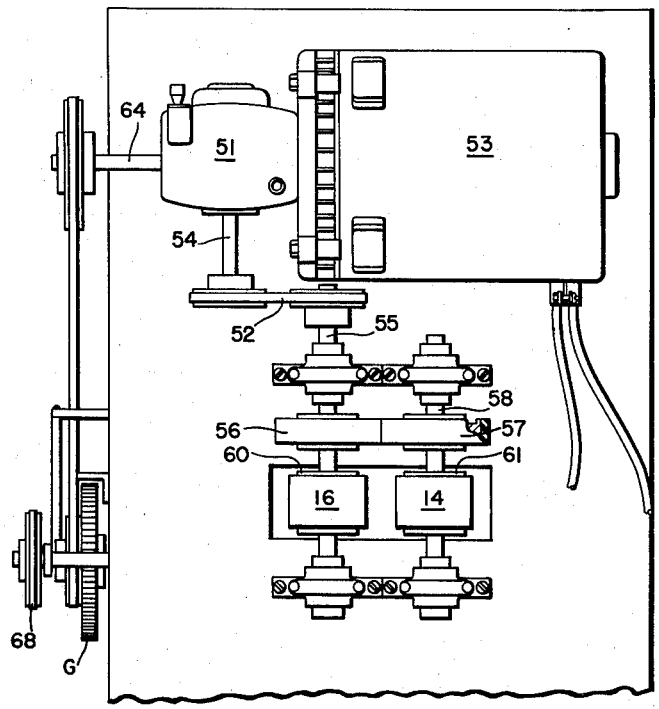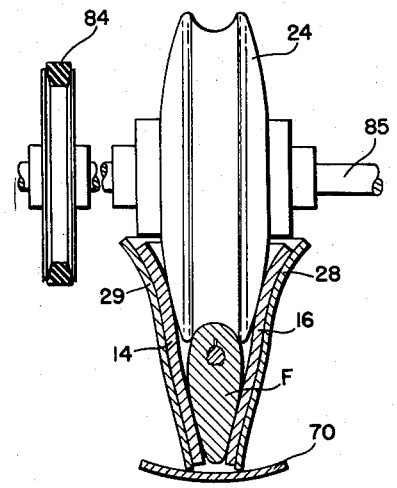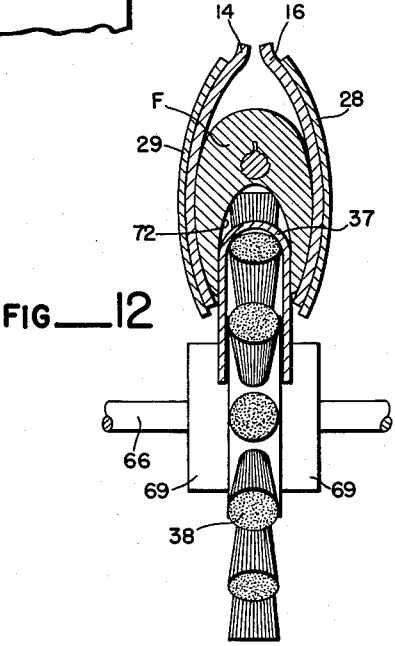

3,003,186
FISH CLEANING MACHINE
Monrad E. Eriksen, Seattle, Wash., assignor to Northland Distributing Co., Inc., Seattle, Wash., a corporation of Washington
Filed Oct. 12, 1959, Ser. No. 845,684
6 Claims. (Cl. 17—3)

This present invention relates to the general art of fish cleaning machinery and more particularly to a machine which is especially adapted to the cleaning of fish which basically do not have a strong bone structure and whose flesh is inclined to soften rapidly after the fish is caught.

In the past many machines have been made for the mechanical cleaning of fish and these have generally met with indifferent success except where the fish itself has a strong bone structure and tends to firm up after being caught. Certain fish dehydrate for at least twenty-four or forty-eight hours after being taken from the water so that they are sufficiently firm to grasp mechanically at a few spaced points and to be thus held while being cleaned. An outstanding successful example of mechanical fish cleaning is the "Iron Chink" that has been used for several decades in the cleaning of salmon. This present machine, however, has demonstrated its ability to successfully clean even the smaller fish such as smelt and the like as an outstanding example of fish that have a weak bone structure and which are usually quite lacking in firmness at the time that they are to be cleaned. In this present machine, it is believed that a practical solution has been achieved in the field of cleaning the so-called "soft fish" and this is achieved by adequately supporting the fish throughout its cleaning operation so that even though the fish is too small to be grasped by steel points and the like, it can be accurately positioned and accurately carried throughout its processing cycle and emerge from the machine fully cleaned and ready for the market.

The principal object of this invention therefore is to provide a machine which guides the fish throughout the sequence of cleaning operations with belt means that engage the fish throughout its entire length.

A further object of this invention is to provide means for cleaning fish in a manner in which the fish are accurately oriented so that a special knife will enter into the stomach cavity from the head end of the fish and slit the stomach cavity open throughout its length so that the fish may be properly presented for cleaning.

A further object of this invention is to provide a plurality of rotary brushes which are revolved on axes transversely disposed to the direction of movement of the fish.

A further object of this present invention is to provide a plurality of rotary cleaning brushes disposed to rotate alternately in opposite directions.

Further objects, advantages and capabilities will be apparent from the description and disclosure in the drawings, or may be comprehended or are inherent in the device.

FIGURE 3 is an enlarged top plan view of the left hand end of FIGURE 2 and with the fish feeding means broken away.

FIGURE 4 is a vertical view taken on a plane parallel to the direction of travel of the feeding belts and illustrating the water feeding means for the lubrication and cleaning of the fish conveying belts.

FIGURE 5 is a vertical cross sectional view taken along the line 5—5 of FIGURE 4 through the slitting knife, conveying belts and the positioning means for the belts.

FIGURE 9 is a perspective view on an enlarged scale taken from the feeding end generally illustrating the principal parts of this present machine together with feed means for supplying the fish to the machine.

FIGURE 10 is an end view in elevation on an enlarged scale taken from the discharge end of this machine.

FIGURE 11 is a cross sectional view on an enlarged scale taken along the axis of rotation of the fish seating wheel and illustrating the positioning of a newly fed fish into the V formed by the conveying belts.

FIGURE 12 is a cross-sectional view on an enlarged scale and in elevation taken between the axis of rotation of two of the fish cleaning brushes.

FIGURE 13 is a bottom plan view on an enlarged scale showing the under surface of a fish's head and a modified form of cleaning knife.

FIGURE 14 is a side elevation on an enlarged scale of a modified knife used in cleaning fish where it is desired to retain the heads intact on the body.

Figure 1:
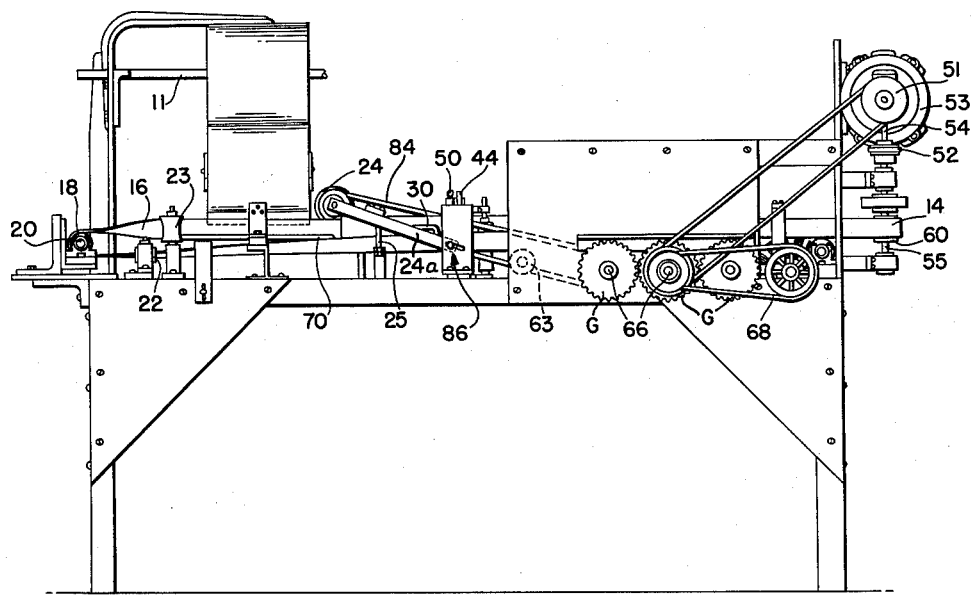
FIGURE 1 is a side elevation of my fish cleaning machine.

Referring to the drawings, throughout which like reference characters indicate like parts, the numeral 10 designates a common form of pocket type conveyor belt and providing a first conveyor having a plurality of fish carrying pockets 13 into which fish, as smelt, have been manually deposited in proper orientation. The fish carrier passes around a drum 15 mounted upon shaft 11 and deposits the fish into the space between the two walls of guideway 12 with the head end of the fish to the right as viewed in FIGURE 9 and with the entrail cavity leading. As it passes down guideway 12 the fish will be delivered to the cleaning machine with the entrail cavity lowermost. Parts 10, 11, 13 and 15 are parts of a beheading means which is old in this field and forms no part of this present invention. The fish is presented for cleaning between the two belts 14 and 16 which are operatively disposed on suitable pulleys 18, both mounted on the same horizontal shaft 20. As the belts travel in the direction of the arrows shown in FIGURE 3 they are engaged by a plurality of rollers which change the lay of the belt from a horizontal position to a vertical position as illustrated sequentially in FIGURE 11, in FIGURES 5 and 6 and finally as in FIGURE 12. Rollers 22 and 23 are suitably profiled and disposed for suitable adjustment to achieve a change of position of belts 14 and 16 as they pass through the machine in the fish transporting and positioning cycle of operation to form a fish receiving seat.

As the oriented fish leaves the guideway 12 and engages belts 14 and 16 the belts undergo a change in their operational planes with the bottom margins of the belts in juxtaposition and the tops outwardly flared. The fish are seated in their proper position in belts 14 and 16 by the revolvable pressure wheel 24 disposed for vertical movement on pivoted parallel arms 24a. Adjustable means are provided so that wheel 24 can be properly positioned as by means of the threaded stud 25 and suitable lock nut means therefore so that the fish will be properly positioned when it is presented to the slitting knife 26.

The fish seating wheel 24 seats the fish in engagement with belts 14 and 16 at a point immediately before the belts are engaged within flexible resilient guide members 28 and 29.

For a fish the size of smelt the general proportions of the knife, belts and guide members are proportionately illustrated in FIGURE 5. In the figure also is illustrated water supply pipes 30 having a plurality of outlets 31. This is supplied by a suitable hose 32 and provides water lubrication for the belts and also supplies water for cleansing purposes. As belts 14 and 16 carry the fish into the machine the pointed end 27 of knife 26 first enters the stomach cavity at the head end of the fish with the head intact or from which the head has already been removed by means not illustrated as they form no part of this invention. The upper edge 34 of the knife is substantially circular in cross section to provide a first guide means and rides on the inner surface of the backbone of the fish and as the fish progresses along the curved cutting edge 35 any tendency to move the fish downwardly is resisted by surface 34.

Figure 8:
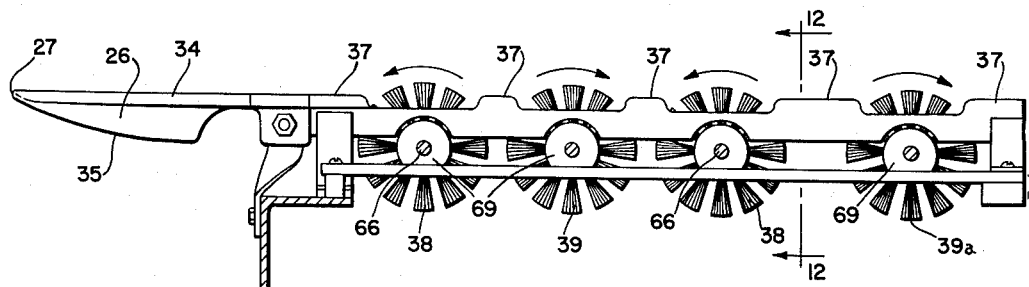
FIGURE 8 is a longitudinal sectional view showing a plurality of the rotary, cleaning brushes which pass through the entrail cavity of the fish.

As the fish passes over knife 26 it is additionally positioned so that it will be precisely deposited upon the repositioning guides 37, shown in FIGURES 12 and 8 and will thus be in an optimum position for the most efficient engagement of the bristle brushes 38 and 39. Guides 37 are made of a common inverted U-shaped bar in which the curved portion is cut away at each brush 38, 39, and 39a. Brushes having plastic bristles have proven very satisfactory in that they can be obtained in various degrees of stiffness and are not effected adversely by being used in a partially bent position in the presence of an abundance of water. A suitable plastic bristle is that sold under the trade name of nylon. It is to be noted that the alternate brushes are driven in a reversed direction as shown by the arrows indicating the rotation of the brushes in FIGURE 8. Suitable drive means, which will be described later, are provided. A preferred arrangement of the knife and rotary brushes is illustrated in FIGURE 8 in which these components are preferably fixedly mounted.

Figure 6:
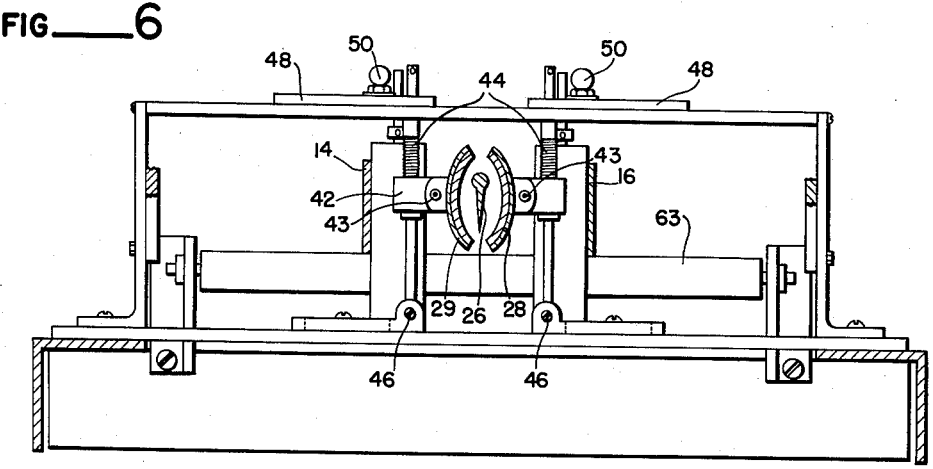
FIGURE 6 is a vertical cross-sectional view on an enlarged scale taken along the lines 6—6 of FIGURE 2.
Figure 7:
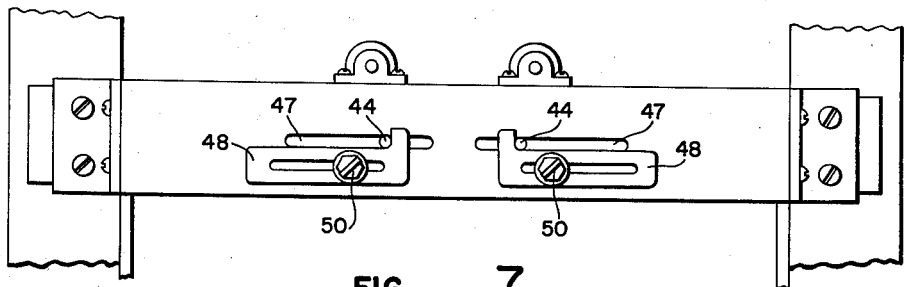
FIGURE 7 is a top plan view of the structure of FIGURE 6.

It is desirable to have the fish carrying belts arranged so that they may be adjusted for fish of different sizes. A satisfactory adjusting means is illustrated in FIGURES 6 and 7 wherein guides 28 and 29 are pivotably secured to cross head means 42 as by screws 43 and the cross head members are positioned for vertical adjustment along screws 44. Screws 44 are reduced in diameter at each end with the lower ends pivoted at 46 and the upper ends disposed in slots 47 and held in adjusted position by slotted, positioning clamps 48 which in turn are locked in position by lock bolts 50. It is to be noted that the fish receiving end of the belts, considering now their vertical projection, runs on an idler shaft 20 which is horizontally positioned. At their opposite ends however belts 14 and 16 run on pulleys 60 and 61 respectively and which are driven by belt 52 which operatively connects suitable pulleys revolving about vertical axes and are driven through gear box means 51 by a suitable source of power as electric motor 53.

A vertical shaft 54 drives by belt means a second vertical shaft 55. Shaft 55 has mounted on it a resiliently faced friction pulley 56 adapted to operatively engage a similar, resiliently faced friction pulley 57 mounted on shaft 58 which it drives in a reversed direction. Secured to shafts 55 and 58 are the belt pulleys 60 and 61 which in turn drive belts 14 and 16 so that the inner runs of the two belts will be traveling in the same direction as is required for the transporting of the fish through the machine. Suitable bearings are provided for shafts 55 and 58. Referring to FIGURE 6 it will be noted that a revolvable roller is provided at 63 and this roller engages the lower edge of the vertically disposed belts 14 and 16 in order to assist in vertically positioning the belts. Engagement is made with the outer runs of the belts which similar to the inside runs are traveling in the same direction; consequently one roller 63 will suffice to give them vertical positioning without friction. The inner runs of belts 14 and 16 do not touch roller 63 as they are transversely curved as will be noted in FIGURES 5, 6 and 12 and are thus raised above the roller. The vertical positioning of fish as they pass over knife 26 and over brushes 38, 39 and 39a is critical as will be observed in FIGURES 11, 12, 13 and 14. Roller 63 establishes the lower edge position of belts 14 and 16. The inner runs are positioned due to the fact that the outer runs are in constant engagement with roller 63 with the distance from roller 63 to pulleys 60 and 61 being too short to develop sag. Motor 53 also drives by means of the horizontal shaft one of three intermeshing gears G which in turn are fixedly secured to the brush carrying shafts 66 and provide the drive for brushes 38 and 39. This intermeshing of the spur gears brings about the alternate rotation illustrated in FIGURE 8 with the exception that brush 39a is driven from the central shaft of the three intermeshing gear drive assemblies by means of suitable pulleys and connecting chain 68. Brushes 38, 39 and 39a have oversized hubs 69 which support guides 37 against excess deflection by oversized fish.

The steps in cleaning the fish will probably be best understood from a study of FIGURES 9, 11, 5 and 12. As the fish is delivered by the guide means 12 belts 14 and 16 take on the form shown in FIGURE 11 in which they form a substantial V with a bottom gauge plate 70 which limits the downward extent to which the fish seating wheel 24 can press the fish F. The fish then advance with belts 14 and 16 changing their position, after the showing of FIGURE 5, and carrying the fish into the elongated knife illustrated in FIGURE 8. The shape of knife 26 tends to remove the entrails in part at least at the same time the knife slits the bottom wall of the entrail cavity. The fish is then carried over the plurality of revolving brushes 38, 39 and 39a which after the showing of FIGURE 12 fully engages the upper limit of the entrail cavity 72. This engagement is insured by the fact that the fish is grasped by the two belts 14 and 16 and the belts themselves are guided within guide members 28 and 29 as illustrated in FIGURE 12. As it is necessary that the guide and belts be spread appreciably, as will be noted in FIGURE 12, it is desirable to provide between each of the cleaning brushes a repositioning vertical guide as 37 and this definitely insures the full and complete cleaning of the entrail cavity and as the fish are discharged by the belts they are in a fully cleaned condition ready for marketing. It follows that for a machine of this order to be commercially successful it must clean fish thoroughly and also it must clean them at a high rate so as to amortize the cost of the equipment. The examples of this machine that have been studied work very satisfactorily where belts 14 and 16 are driven at a speed of 350 feet per minute and this will give a maximum cleaning capacity of 600 fish per minute of operation.

Referring to FIGURES 13 and 14 a modified form of knife 76 is illustrated. This knife is similar in most respects to the form of knife shown at 26 excepting that it is intended for use in cleaning fish where it is desired to leave the head connected to the body. To accomplish this the upper or rest portion 78 of the knife has its pointed end split to form a V 79 having the two sharpened surfaces 80 and 81. When the fish is presented in cleaning, the V-shaped point of the knife spans the throat portion of the fish where it is rather slender, as indicated at 82, and cuts this throat member. As the fish proceeds along the knife, being carried by the belts 14 and 16, the curved blade portion of the knife functions as previously and slits open the stomach cavity of the fish so the operation is as previously described excepting that the head is left attached to the fish body.

Figure 2:
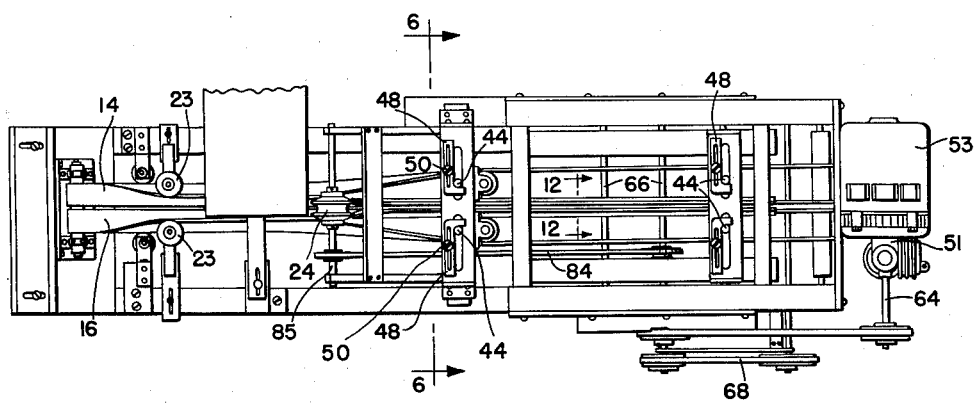
FIGURE 2 is a top plan view of the machine of FIGURE 1.

To better meet certain operational conditions as the condition of the fish, speed of operation and the like it is often desirable to positively drive wheel 24. Such a drive is shown in FIGURES 1, 2 and 11 in which belt 84 is driven from one of the shafts 66 of proper rotation and drives shaft 85 on which wheel 24 is secured.

Suitable pulleys are employed to provide a peripheral speed for wheel 24 equal to the lineal speed of the fish engaged.

A slot and clamp bolt is provided at 86 to permit suitable length adjustment of belt 84.

It is believed that it will be apparent from the above description and the disclosure in the drawings that the invention comprehends a novel construction of a fish cleaning machine.

Having thus disclosed the invention, I claim:

1. A fish cleaning machine, comprising: a pair of power driven horizontally disposed fish transporting belts positioned in transversely spaced relationship and with the plane of each belt substantially vertical throughout its fish handling range; said belts operatively disposed on pulleys revolving about horizontal axes at the fish receiving end of the belts, and driven by power driven pulleys revolving about vertical axes at the fish discharge end; adjustable rollers at the fish receiving end of said belts disposed to position the inner runs of said belts with their bottom margins juxtapositioned and the two tops outwardly flared to form a fish receiving seat; pressure means positioned between the tops of said belts to engage the fish and press it downwardly between said belts; resilient, transversely curved guide members engaging the outer surfaces of the inner runs of said belts and curving each belt partially around the respective sides of said fish and a bottom gauge plate disposed below said belts, said guide members and said pressure means limiting the downward extent that said pressure means can press said fish; fish slitting means and fish cleaning, revolvable brushes disposed on the line of movement of fish as they are transported through said machine.

2. The subject matter of claim 1 in which said slitting means comprises: a fixed, horizontal slitting knife disposed on the line of travel of said fish, the upper edge of said knife being substantially circular in cross-section to provide a first guide means for said fish and a downwardly directed cutting blade starting at the pointed end of the knife and increasing in width as the fish progress along the blade to insure full slitting of the stomach cavity.

3. The subject matter of claim 1 in combination with a plurality of aligned repositioning guides disposed in the line of travel of the fish being cleaned and at the same elevation as the said top of said knife; said guides formed of an inverted U-shaped member of sheet material with the top portion cut away at spaced intervals; said fish cleaning brushes comprising: a plurality of rotary bristle brushes of alternate rotation passing upwardly through said U-shaped member and said cut-away top portions to a level to engage the stomach cavity of the fish; said brushes disposed for rotation on axes of rotation transversely of the line of movement of the fish and having oversized hubs to support said repositioning guides against downward deflection by oversized fish.

4. The subject matter of claim 1 in combination with adjustable means for positioning said resilient curved guide members, said means comprising cross head means having vertical screw adjusting means and means pivotably secured to said cross heads and clamp means for adjustably positioning said vertical screw means transversely of said belts.

5. The subject matter of claim 1 in which said pressure means, comprises: a grooved wheel having power means driving it at a peripheral speed equal to the lineal speed of the fish engaged.

6. The subject matter of claim 5 in which said grooved wheel is revolvably supported on a shaft transversely disposed to the direction of travel of said belts, said shaft supported on pivoted parallel arms and having threadedly adjustable stop means limiting the downward movement of said wheel.

References Cited in the file of this patent

UNITED STATES PATENTS

| | | |
|---|---|---|
| 142,918 | Kelsey et al. | Sept. 16, 1873 |
| 676,073 | Munn et al. | June 11, 1901 |
| 1,116,082 | Lamoreaux | Nov. 3, 1914 |
| 2,210,234 | Durand | Aug. 6, 1940 |
| 2,466,614 | Rivers | Apr. 5, 1949 |
| 2,917,772 | Schlichting | Dec. 22, 1959 |